United States Patent
Hori et al.

(10) Patent No.: US 6,198,710 B1
(45) Date of Patent: Mar. 6, 2001

(54) DIGITAL RECORDING METHOD, DIGITAL DISK, DIGITAL DISK RECORDING DEVICE, AND DIGITAL DISK REPRODUCING DEVICE

(75) Inventors: Yoshihiro Hori, Gifu; Hisashi Matsuyama, Ogaki; Akiomi Kunisa, Kasukabe; Nobuo Itoh, Nagoya; Seiichiro Takahashi, Gifu; Toshiaki Hioki, Ogaki; Kenji Asano, Kakamigahara; Noboru Mamiya, Gifu; Yoshiharu Uchihara, Ogaki; Kenji Nakao; Satoshi Sumi, both of Gifu; Kenji Torazawa, Ogaki, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/091,163
(22) PCT Filed: Jul. 28, 1997
(86) PCT No.: PCT/JP97/02621
  § 371 Date: Jun. 9, 1998
  § 102(e) Date: Jun. 9, 1998
(87) PCT Pub. No.: WO98/16929
  PCT Pub. Date: Apr. 23, 1998

(30) Foreign Application Priority Data

Oct. 11, 1996 (JP) .................................. 8-270043
Nov. 1, 1996 (JP) .................................. 8-292084
Mar. 17, 1997 (JP) .................................. 9-063406

(51) Int. Cl.$^7$ .................................................. G11B 5/76
(52) U.S. Cl. ...................... 369/59; 369/47; 369/124.04
(58) Field of Search .............................. 369/47, 48, 49, 369/59, 60.01, 62, 124.04, 124.07, 124.08; 360/29, 30, 40

(56) References Cited

FOREIGN PATENT DOCUMENTS

| | | |
|---|---|---|
| 0 343 930 A2 | 11/1989 | (EP) . |
| 0 415 853 A2 | 3/1991 | (EP) . |
| 0 593 173 A2 | 4/1994 | (EP) . |
| 0 732 698 A1 | 9/1996 | (EP) . |
| 0 932 528 A1 | 7/1999 | (EP) . |
| 2-96982 | 4/1990 | (JP) . |
| 3-237631 | 10/1991 | (JP) . |
| 5-314562 | 11/1993 | (JP) . |
| 6-60552 | 3/1994 | (JP) . |
| 6-139582 | 5/1994 | (JP) . |
| 7-311962 | 11/1995 | (JP) . |
| 8-46526 | 2/1996 | (JP) . |

OTHER PUBLICATIONS

Hirotake Ishii et al: "A New 8–12 Conversion Channel Code and Its Application to High Data–Rate Video Recording" Electronics & Communications in Japan, vol. 78, No. 7, Jul. 1, 1995 (Aug. 1, 1995), pp. 103–113, XP000545773, ISSN: 8756–663X (the whole document).

Primary Examiner—Paul W. Huber
(74) Attorney, Agent, or Firm—Armstrong, Westerman, Hattori, McLeland & Naughton

(57) ABSTRACT

A meandering groove is formed in a digital disk (10) with a wobble signal that is wobbled to reproduce a clock signal. The wobble signal is read out by an optical head (26). An address detection circuit (40) detects an address signal that is multiplexed with the wobble signal. A PLL oscillation circuit (24) provides a clock signal in synchronization with the wobble signal. Data is modulated by a modulation circuit (16) according to the clock signal and a timing signal based on the address signal, and recorded on the digital disk (10). In reproduction, a RF signal in the wobble signal is converted into a digital signal by an A/D converter (42). The signal is demodulated by a demodulation circuit (44) for data output.

12 Claims, 22 Drawing Sheets

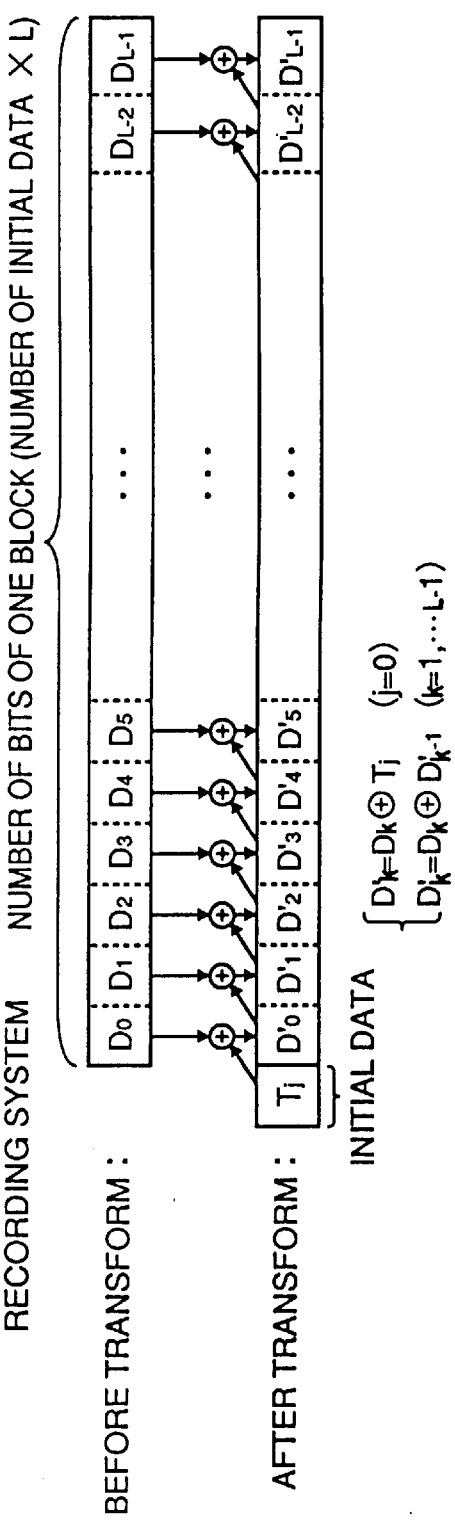
Fig. 8A  MODULATION, RECORDING SYSTEM
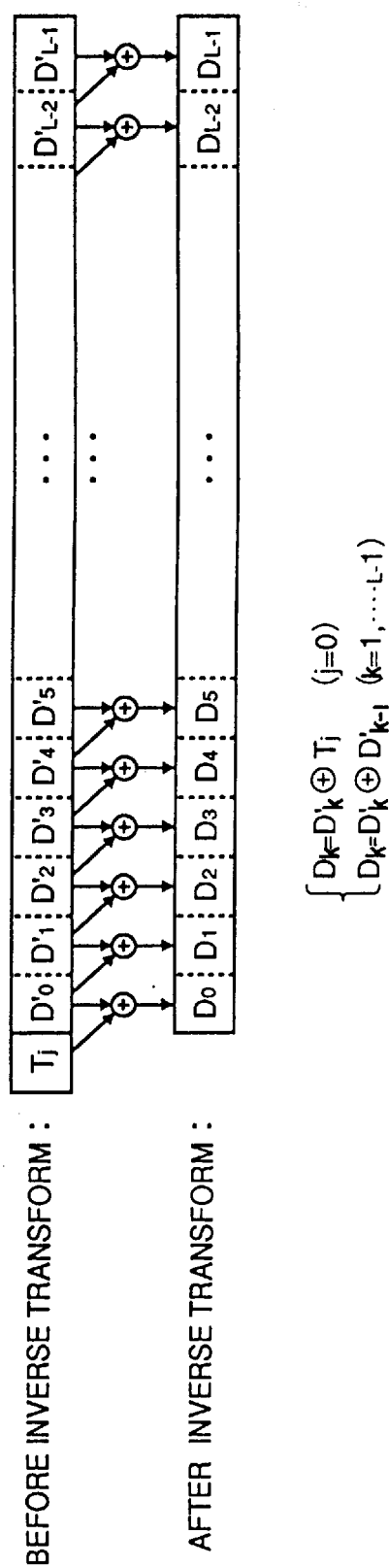
Fig. 8B  DEMODULATION, REPRODUCTION SYSTEM

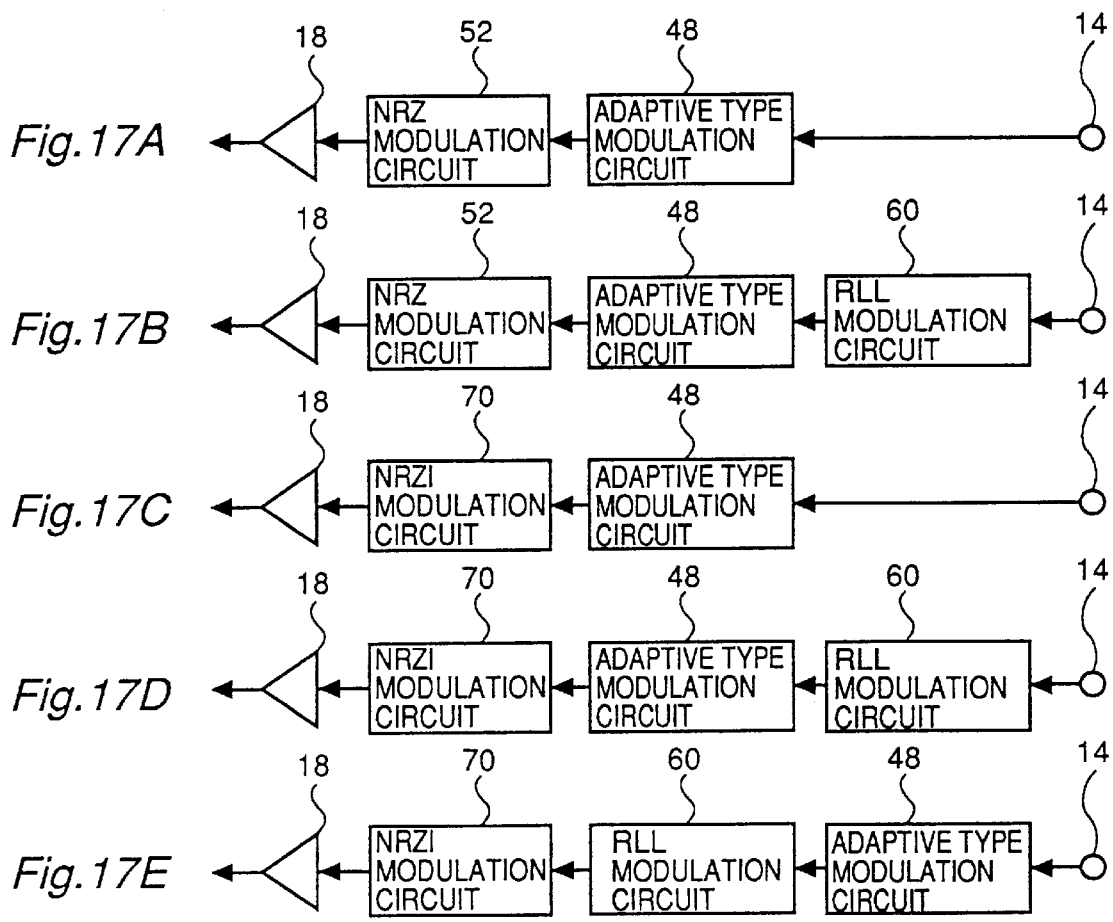

DIGITAL RECORDING METHOD, DIGITAL DISK, DIGITAL DISK RECORDING DEVICE, AND DIGITAL DISK REPRODUCING DEVICE

This Application is a 371 of PCT/JP97/02621 Jul. 28, 1997.

TECHNICAL FIELD

The present invention relates to a digital recording method, a digital disk, a digital disk recording apparatus, and a digital disk reproduction apparatus, and more particularly, to a digital recording method for recording digital data efficiently onto a medium, a digital disk, a digital disk recording apparatus, and a digital disk reproduction apparatus.

BACKGROUND ART

The media of magneto-optical disks, optical disks, phase change disks, and the like are known as digital disks. The recording and reproduction of the disk are all carried out by data transfer in AC coupling. This means that it is difficult to record/reproduce signal components of the low frequency region at high efficiency with respect to data recorded at high density on a digital disk.

It is therefore necessary to carry out modulation that suppresses the direct current and low frequency components for recording data. The recorded data stream includes the clock frequency components of recording. At the time of reproduction, the clock frequency components are extracted from the signal of the reproduced data stream. Self clock control is provided that reproduces the reference clock of the reproduction apparatus by the extracted clock frequency component. In modulating digital data, self clock control must be feasible and with few direct current and low frequency components. EFM, 1–7 RLL modulation, 2–7 RLL modulation and the like are known as such modulation systems. RLL-modulated data is NRZI-modulated or NRZ-modulated and recorded on a medium.

Japanese Patent Laying-Open No. 2-96982 proposes a method of preparing a plurality of pseudo random data streams and scrambling the data stream with the pseudo random data that has the smallest DSV (Digital Sum Variation) at the time of recording. Such an adaptive type modulation method that reduces the value of DSV is proposed.

It is known to form a sine wave shape (wobble shape) having a predetermined cycle and amplitude at the wall of a groove in a disk medium. This wobble is well known by those skilled in the art as disclosed in, for example, Japanese Patent Laying-Open No. 7-311962. Address information and the like are recorded in a multiplexed manner by this wobble.

SUMMARY OF THE INVENTION

A main object of the present invention is to provide a digital recording method of favorable digital recording efficiency, a digital disk, a digital disk recording apparatus and a digital disk reproduction apparatus.

Another object of the present invention is to propose an example of an adaptive type modulation method that suppresses direct current and low frequency components.

The present invention is directed to a digital recording method of selecting and recording modulation record data that has the direct current component at the time of recording suppressed, out from a group of modulation record data candidates. A plurality of types of data of a predetermined number of bits are added to input data as initial data. In a predetermined sequence for every predetermined number of bits, exclusive-OR is taken between the current code modulation unit to be transformed and the code modulation unit immediately preceding that current code modulation unit. By applying a convolution process substituting for that current code modulation unit, a group of candidates of a plurality of types of modulation record data are generated from the input data. The direct current component in the recording operation of each of the plurality of modulation record data are compared with each other. Modulation record data is selected and recorded according to the comparison result. By the invention of the present application, the direct current component at the recording/reproduction system can be suppressed with only a slight increase in data length.

According to a preferable embodiment of the present invention, the data length n of the initial data added to the input data is $2 \leq n \leq 32$. More preferably, the data length n of the initial data is $4 \leq n \leq 8$.

Further preferably, the data length m of the input data is L times (L is an integer of at least 2) the initial data.

According to another aspect of the present invention, a digital disk has a wobble formed. A data stream is formed in phase synchronization with the wobble configuration.

According to another aspect of the present invention, a digital disk recording apparatus writes data in synchronization with the wobble formed in a digital disk. A wobble signal is extracted from the digital disk. A reference clock signal is generated in synchronization with the wobble signal. Data is written according to the reference clock signal.

According to yet another aspect of the present invention, a digital disk reproduction apparatus reads out written data in synchronization with the wobble formed in a digital disk. A wobble signal is extracted from the digital disk. A reference clock signal is generated in synchronization with this wobble signal. A reproduced signal is digitized by the reference clock signal.

BRIEF DESCRIPTION OF THE DRAWINGS

FIGS. 8A and 8B are diagrams for describing an optimum adaptive type modulation method.

FIGS. 17A–17E are block diagrams showing combination examples of modulation circuits.

BEST MODE FOR PRACTICING THE INVENTION

Embodiments of the present invention will be described in detail hereinafter with reference to the drawings.

Figure 1:
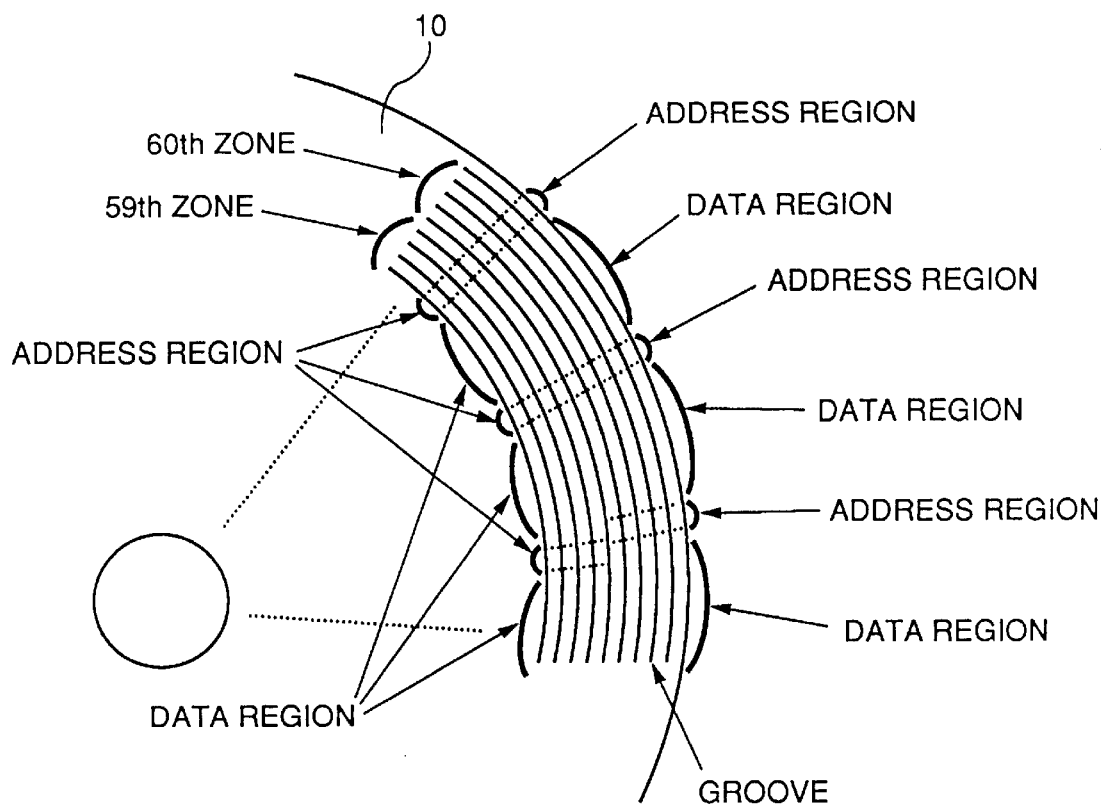
FIG. 1 shows a magneto-optical disk according to a first embodiment of the present invention.
Figure 2:
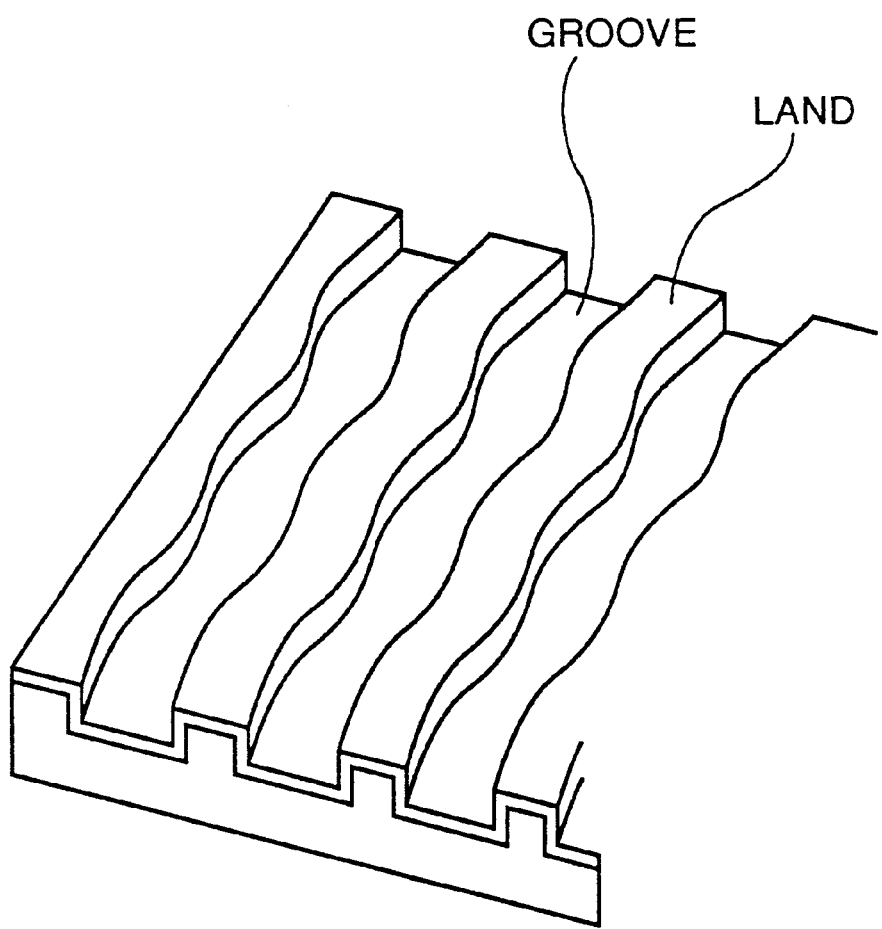
FIG. 2 shows a portion of the magneto-optical disk of FIG. 1.

FIG. 1 shows a magneto-optical disk according to a first embodiment of the present invention; FIG. 2 shows a portion of this magneto-optical disk; and FIG. 3 shows a reproduction waveform of a wobble signal.

Referring to FIG. 1, a digital disk 10 is a magneto-optical disk, employing the zone CLV system (ZCLV system). This ZCLV system is well known, so that detailed description thereof will not be repeated. Magneto-optical disk 10 has a groove formed at the surface of the disk. The groove is provided in a spiral manner from the inner circumference towards the outer circumference of the disk. The wall at both sides of this groove meanders as shown in FIG. 2. In the mastering process of the glass plate to form this disk, a meander groove is formed with a wobble signal that is wobbled by a unitary frequency clock that becomes the reference in disk rotary control and in generating a bit clock in recording/reproducing data. This is called "clocking wobble". In this case, the frequency of clocking wobble is recorded so as to be in synchronism with the data to be recorded. In the first embodiment, the frequency of the clock wobble is set to 1.1 MHz, which is ⅛ the clock frequency 8.8 MHz (constant rotary control) in data recording.

The groove has an amplitude of approximately 10 nm to 50 nm in the radius direction of the disk. Each track of the groove on the disk is formed of 60 zones radially for ZCLV control. CVL control is provided for each zone. In this ZCVL, control is provided so that the revolution is greater at the inner circumferential zone and smaller at the outer circumferential zone to reduce difference in the linear velocity between different zones. As shown in FIG. 1, the groove has a data region in which data is written and an address region multiplexed with the absolute address information formed on the disk. At the wobble of the address region, address information is modulated beforehand using a bi-phase coding method and the like with respect to the wobble signal to be incorporated as a wobble of the groove.

Figure 3:
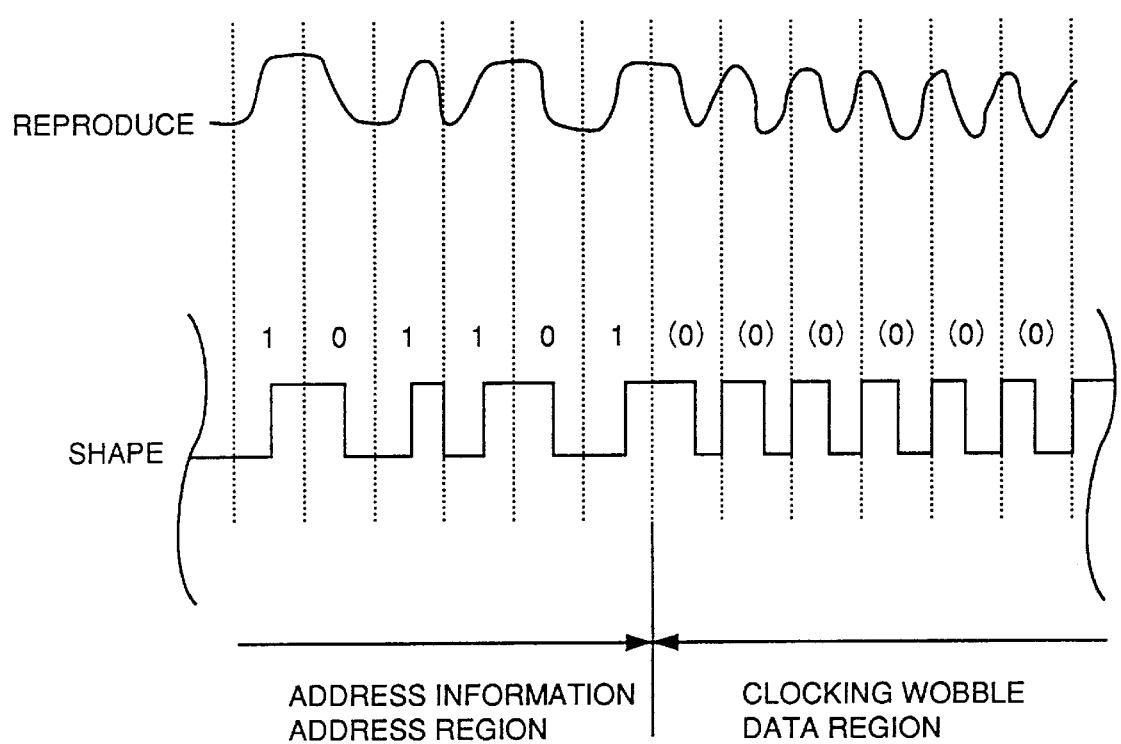
FIG. 3 shows a reproduction waveform of a wobble signal.

FIG. 3 shows a wobble signal in the proximity of the boundary of the address region. When the information serving as an address mark is recorded by wobble as address information at the address segment area, it is apparent from FIG. 3 that 0 is recorded as a value of bi-phase data for the clocking wobble portion. Therefore, a signal which is a bi-phase-modulated version of the address information data is formed in wobble at the address region area of FIG. 1. In the data region area, a signal which is a bi-phase-modulated version of the data that takes the value of 0 is formed at the wobble. A reproduced signal from this wobble can be used for controlling the disk rotation.

One feature of the present invention lies in that this wobble is used as a reference for generating a clock oriented to writing with respect to data that is to be recorded/reproduced. Another feature of the present invention lies in that this wobble is used as a reference for generating a clock for reading with respect to data that is to be recorded/reproduced. In other words, data is recorded/reproduced in synchronization with this wobble.

Figure 4:
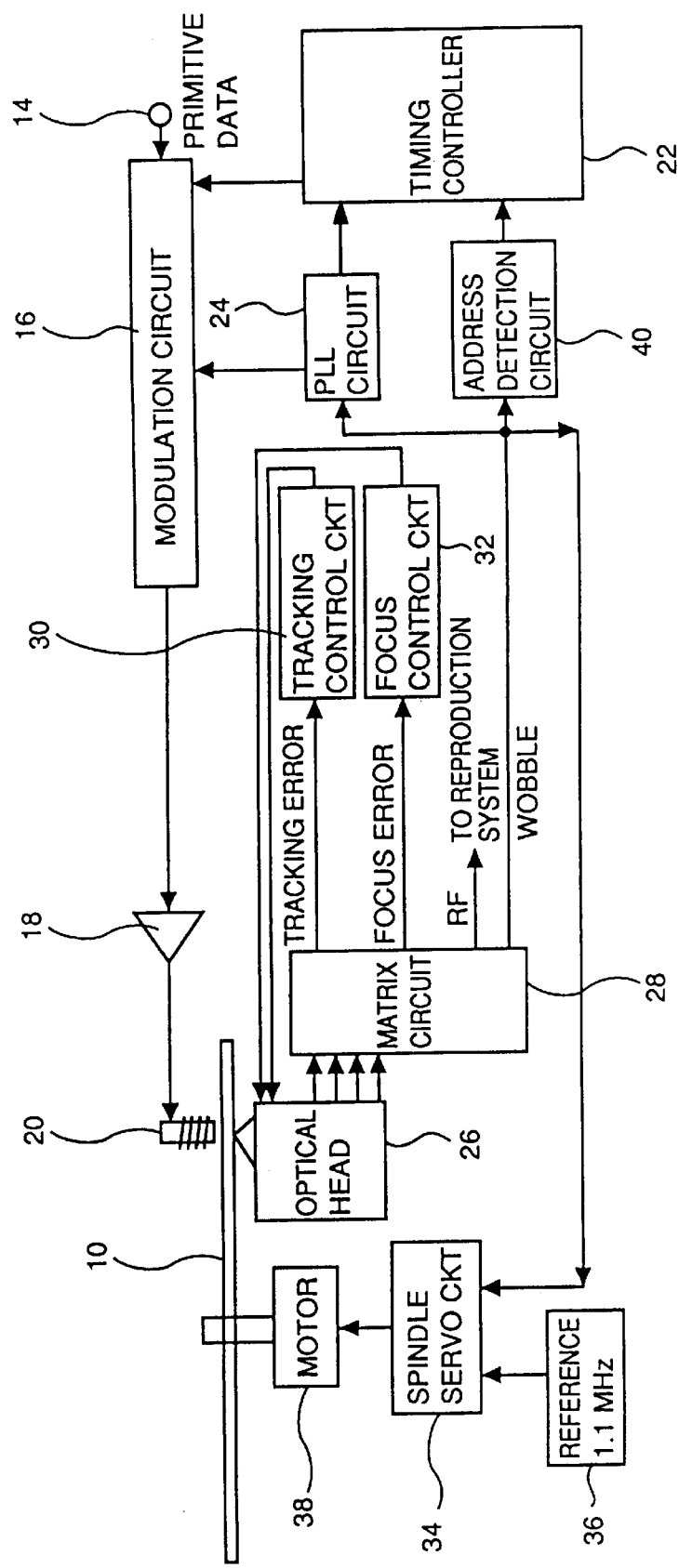
FIG. 4 is a block diagram showing an example of a recording apparatus.

FIG. 4 is a schematic block diagram of a recording apparatus. The magneto-optical disk recording/reproduction apparatus of FIG. 4 does not have the circuitry of the reproduction system depicted since only recording operation is described here.

Data to be recorded (referred to as primitive data hereinafter) is input through an input terminal 14. This primitive data is modulated by a modulation circuit 16 and provided to a magnetic head 20 via an amplifier 18 to be recorded on magneto-optical disk 10. The process carried out by modulation circuit 16 includes an error correction coding method for error correction in reproduction, an adaptive type modulation to reduce the DSV value, NRZ modulation (or NRZI modulation) and the like.

The data recorded on magneto-optical disk 10 is recorded into the data region in synchronization with the wobble. A write timing signal therefor is applied from a timing controller 22 to modulation circuit 16. A write clock signal is supplied from a PLL oscillation circuit 24 to modulation circuit 16. A wobble signal from the wobble formed in magneto-optical disk 10 is read out by optical head 26. The read output is provided to a matrix circuit 28.

Matrix circuit 28 outputs a tracking error signal, a focus error signal, a RF signal, and a wobble signal according to the output of optical head 26. The tracking error signal is applied to a tracking control circuit 30. The focus error signal is applied to a focus control circuit 32. The tracking control signal and the focus control signal are returned to optical head 26. The RF signal output from matrix circuit 28 is applied to the reproduction system to be demodulated. The wobble signal output from matrix circuit 28 is applied to PLL circuit 24, an address detection circuit 40, and a spindle servo circuit 34. Spindle servo circuit 34 compares the wobble signal with a signal from a 1.1 MHz reference oscillator 36 to provide control of the rotation of a motor 38, whereby the wobble signal and the 1.1 MHz reference signal synchronize with each other. Address detection circuit 40 detects an address signal that is multiplexed in bi-phase with the wobble signal. The value of the detected address signal and a detection timing signal are applied to timing controller 22. PLL oscillation circuit 24 provides a 8.8 MHz clock signal in phase synchronization with the 1.1 MHz wobble signal.

In the example shown in FIG. 4, data is recorded on magneto-optical disk 10 by the clock signal in synchronization with the reproduced wobble signal. More specifically, the data recorded on magneto-optical disk 10 is written in synchronization with the wobble configuration.

Figure 5:
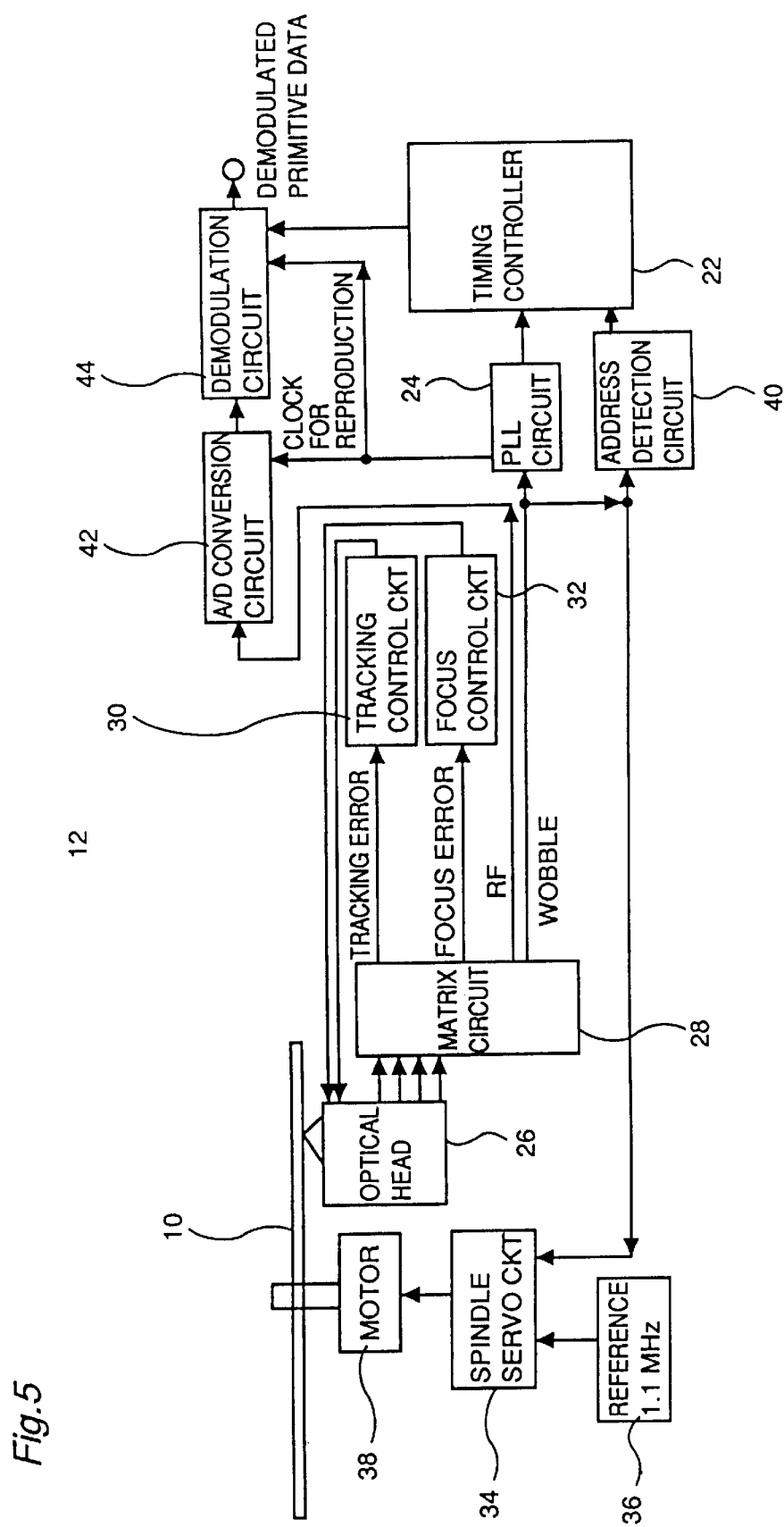
FIG. 5 is a block diagram showing an example of a reproduction apparatus.

FIG. 5 is a block diagram showing a reproduction apparatus according to an embodiment of the present invention. FIG. 5 has only the reproduction system depicted. Only elements differing from those of FIG. 4 will be described here. The RF signal output from matrix signal 28 is applied to an A/D conversion circuit 42. A/D conversion circuit 42 receives a clock signal for reproduction from PLL circuit 24. The RF signal is binarized according to this clock signal for reproduction. The digital data from A/D conversion circuit 42 is applied to a demodulation circuit 44. The clock signal for reproduction from PLL circuit 24 is also applied to demodulation circuit 44. The digital data is demodulated according to this clock signal for reproduction to be restored to primitive data. This process of demodulation circuit 44 is opposite to that of modulation circuit 16 of FIG. 4.

In the embodiment shown in FIG. 5, a clock signal in synchronization with a reproduced wobble signal is generated, and a data reproduction process is carried out by this clock signal. According to the present embodiment, a clock signal in synchronization with reproduction data can be obtained without generating a clock signal from the clock component of a RF signal. In other words, recording and reproduction of a sufficient level can be effected without taking account of a self clock signal that was considered to be mandatory for conventional digital recording/reproduction. The modulation system of the present embodiment takes into consideration both the issues of "self clock" and "DSV value suppression". It can be said that the conventional RLL modulation is no longer mandatory for digital disk recording/reproduction. The conventional RLL modulation has the disadvantage that the amount of data is great. For example, in 1–7 modulation [(1, 7, 2, 3) modulation], the DSV value can be suppressed. However, the primitive data of 2 bits is increased to 3 bits. In other words, the amount of data is increased 50% by this modulation.

As an adaptive type modulation method of the apparatus of the present embodiment, the data recording efficiency can be improved by employing only the adaptive type modulation introduced in the aforementioned Japanese Patent Laying-Open No. 2-96982, not the typical RLL modulation.

In the adaptive type modulation of Japanese Patent Laying-Open No. 2-96982, the information indicating the pseudo random series for demodulation is also recorded to send this information (information code) to the reproduction side. However, when an error is generated in data reproduction to result in an erroneous information code, there is a possibility that erroneous propagation is generated in the entire scrambled data block.

Since suppression of the DSV value is insufficient in the conventional 1–7 RLL modulation, a further modulation method that can suppress the DSV value is required. However, the amount of data will be further increased for this purpose. In the following second embodiment, adaptive modulation according to the DSV value can be effected with little increase in the amount of data. Also, modulation with lower error propagation is carried out.

Figure 6:
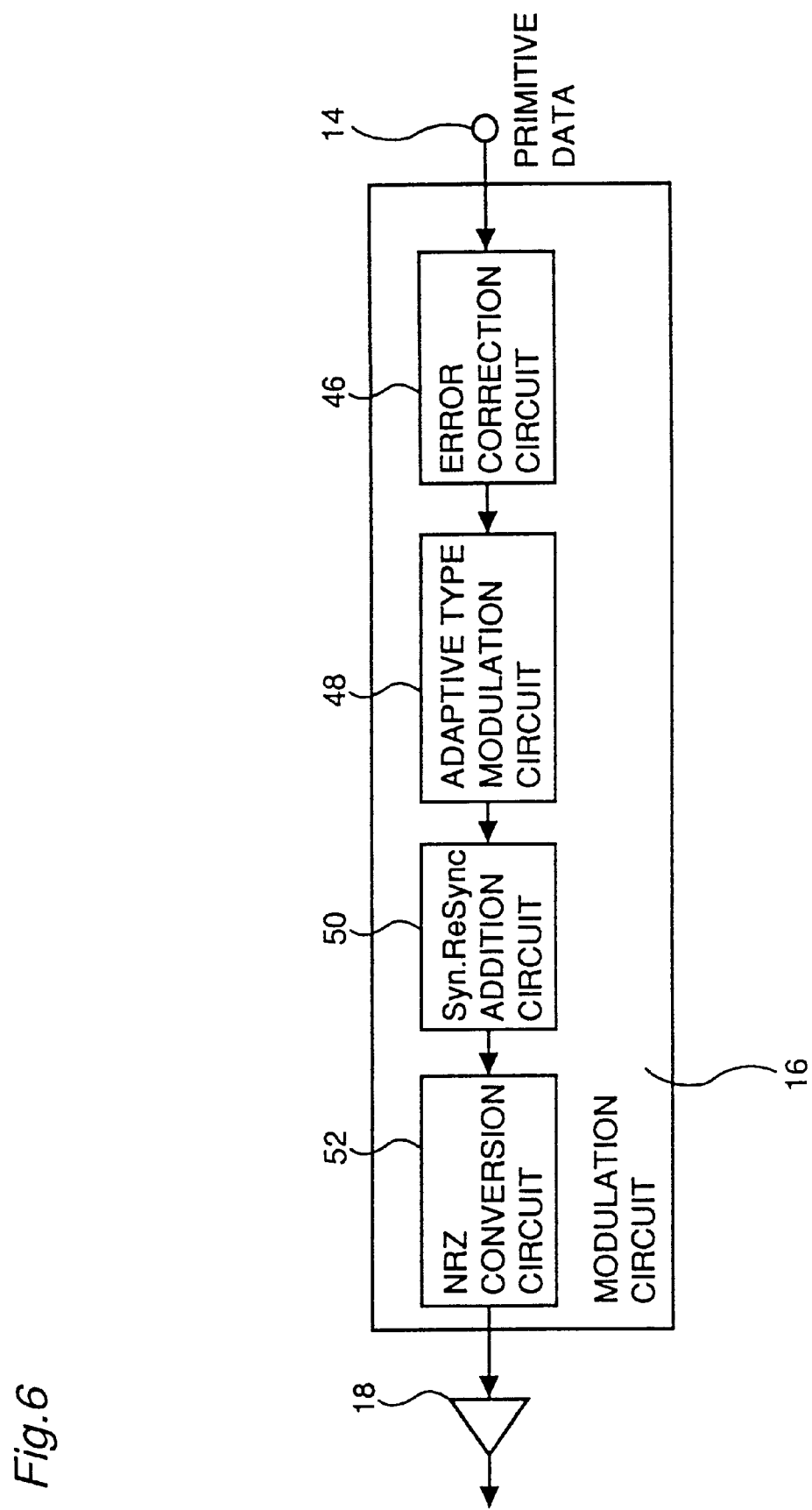
FIG. 6 is a block diagram showing an example of the modulation circuit shown in FIG. 4.
Figure 7:
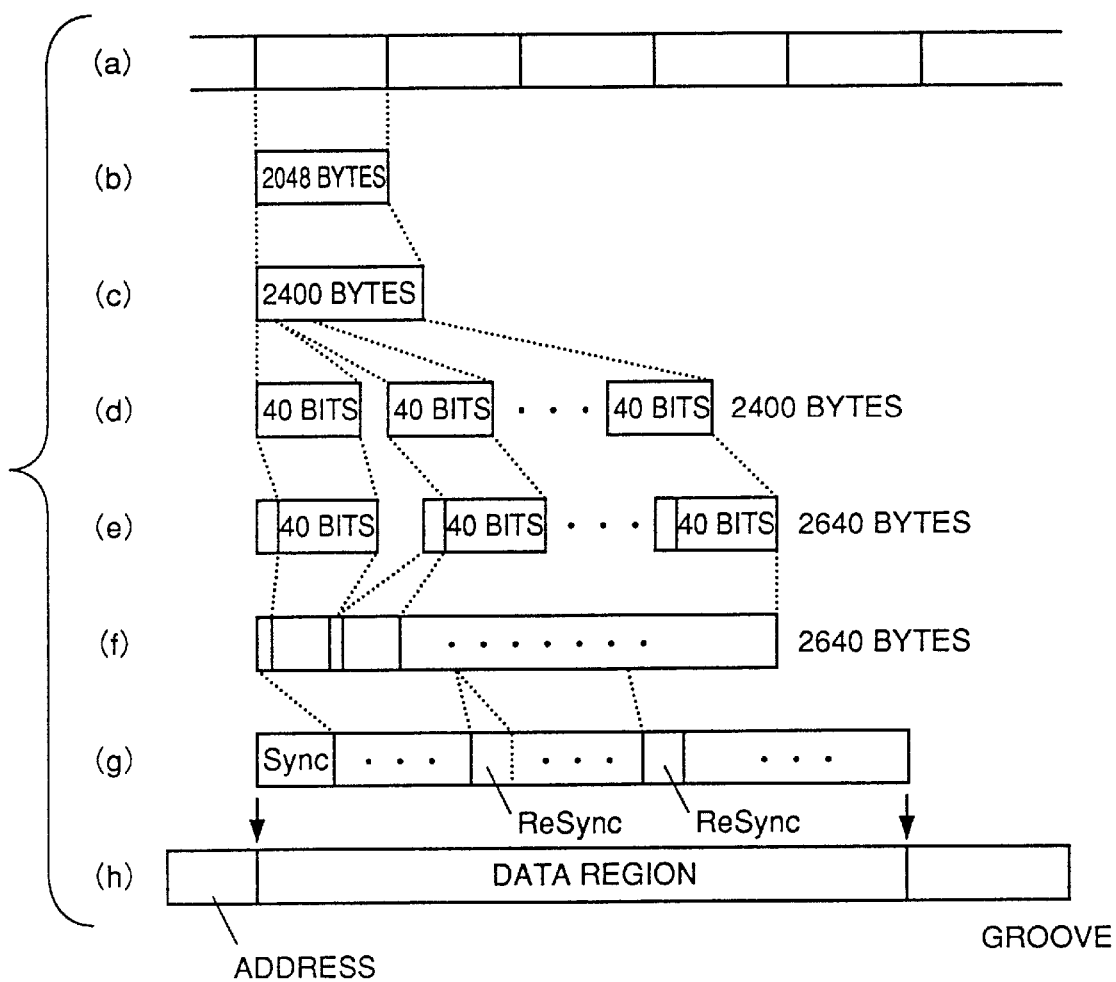
FIG. 7 is a diagram for describing an operation of the modulation circuit of FIG. 6.

FIG. 6 is a block diagram of the modulation circuit of FIG. 4; FIG. 7 is a diagram for describing an operation of the modulation circuit of FIG. 6; and FIGS. 8A and 8B are diagrams for describing adaptive type modulation.

Since the demodulation circuit carries out a process opposite to that of modulation circuit 16, a block diagram thereof is not particularly depicted. In the present embodiment, primitive data of approximately 2-K bytes (2048 bytes) is recorded into one data region of magneto-optical disk 10. The input primitive data is applied to an error correction coding circuit 46. Error correction coding circuit 46 divides the primitive data of FIG. 7(a) into units of 2048 bytes to apply an error correction coding process on the 2048-byte data of FIG. 7(b). As shown in FIG. 7(c), an error correction code is added to be converted into data of 2400 bytes.

This data is applied to an adaptive type modulation circuit 48. Adaptive type modulation circuit 48 divides the data of FIG. 7(c) into units of 40 bits. Initial data of 4 bits is added to each 40-bit data of FIG. 7(d). Then, the data is divided for every 4 bits. The convolution process of exclusive-OR is applied between the 4-bit data and the initial data for modulation. By selecting the value of the 4-bit data to be added, the DSV value can be suppressed. This will be described afterwards. As shown in FIG. 7(f), the data of 2640 bytes is applied to a Sync•Resync addition circuit 50. A Sync•Resync signal is added by this Sync•Resync addition circuit 50 as shown in FIG. 7(g). This data is recorded on magneto-optical disk 10 via an NRZ modulation circuit 52 and amplifier 18.

The adaptive type modulation of the present embodiment will be described in detail hereinafter. In data conversion, initial data of a plurality of bits is added to the head of each one block data. If this initial data is 2 bits, there are four possible types of values [00] [01] [10] [11]. If this initial data is 4 bits, the sixteen values of [0000] [0001] [0010] [0011] [0100] [0101] [0110] [0111] [1000] [1001] [1010] [1011] [1100] [1101] [1110] [1111] are possible.

Thus, initial data (transform number j) of j types (j is a power of 2) is added to generate j pre-transform block data.

The principle of conversion will be described with reference to FIGS. 8A and 8B. For each of the j pre-transform data starting from the head transform unit excluding the initial data, an exclusive-OR (modulo2) operation is performed between the current code transform unit to be transformed and the transform unit (initial data or transformed code modulation unit) right before the current code transform unit. The result is substituted for the current code modulation unit (convolution process). As a result, j post-transform data are generated. More specifically, for each of the j pre-transform data, modulo2 operation of the first code transform unit D0 and initial data Tj is carried out to produce post-transform data D'0 of the first code transform unit excluding the initial data. This data D'0 is substituted for D0.

Then, modulo2 operation is carried out of data D'0 of the transformed code transform unit and the next code transform unit D1 to produce the next post-transform data D'1. This value is substituted for D1. A similar process is repeated up to the last code transform unit of that block. In data demodulation, in the order of the transform unit excluding the first demodulation code unit (initial data Tj) of the pre-inverse transform data, exclusive-OR operation is carried out between the current transform unit to be inverse-transformed and the transform unit (initial data or demodulation code unit before inversion) right before the current transform unit. The obtained value is substituted for the relevant current demodulation code unit. As a result, post-inverse transform data is generated. More specifically, by the modulo2 operation of the first demodulation code unit D'0 and initial data Tj, post-inverse transform data D0 is generated, which is substituted for D'0. Then, modulo2 operation is carried out between D'0 (demodulation code unit before inverse transform) and the next demodulation code unit D'1, whereby the next post-inverse transform data D1 is generated. This value is substituted for D'1.

A similar process is repeated up to the last demodulation code unit of the relevant data. In data inversion, one immediately preceding demodulation code unit that is not yet inverted is used in the inverse transform of the current demodulation code unit. Therefore, the effect of an error, if any, is limited to the current modulation code unit, and will not be propagated to the subsequent modulation code unit. For example, when there is an error in modulation code unit D'i that is not yet inverse-transformed, only the post-inverse transform demodulation code unit Di and Di+1 are affected by this error.

A specific manner of data transform will be described to provide the principle of the above process.

Figure 9:
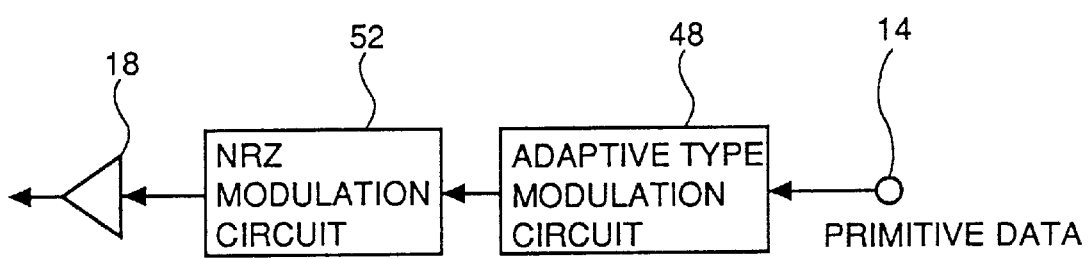
FIG. 9 is a block diagram of an adaptive type modulation circuit.
Figure 10:
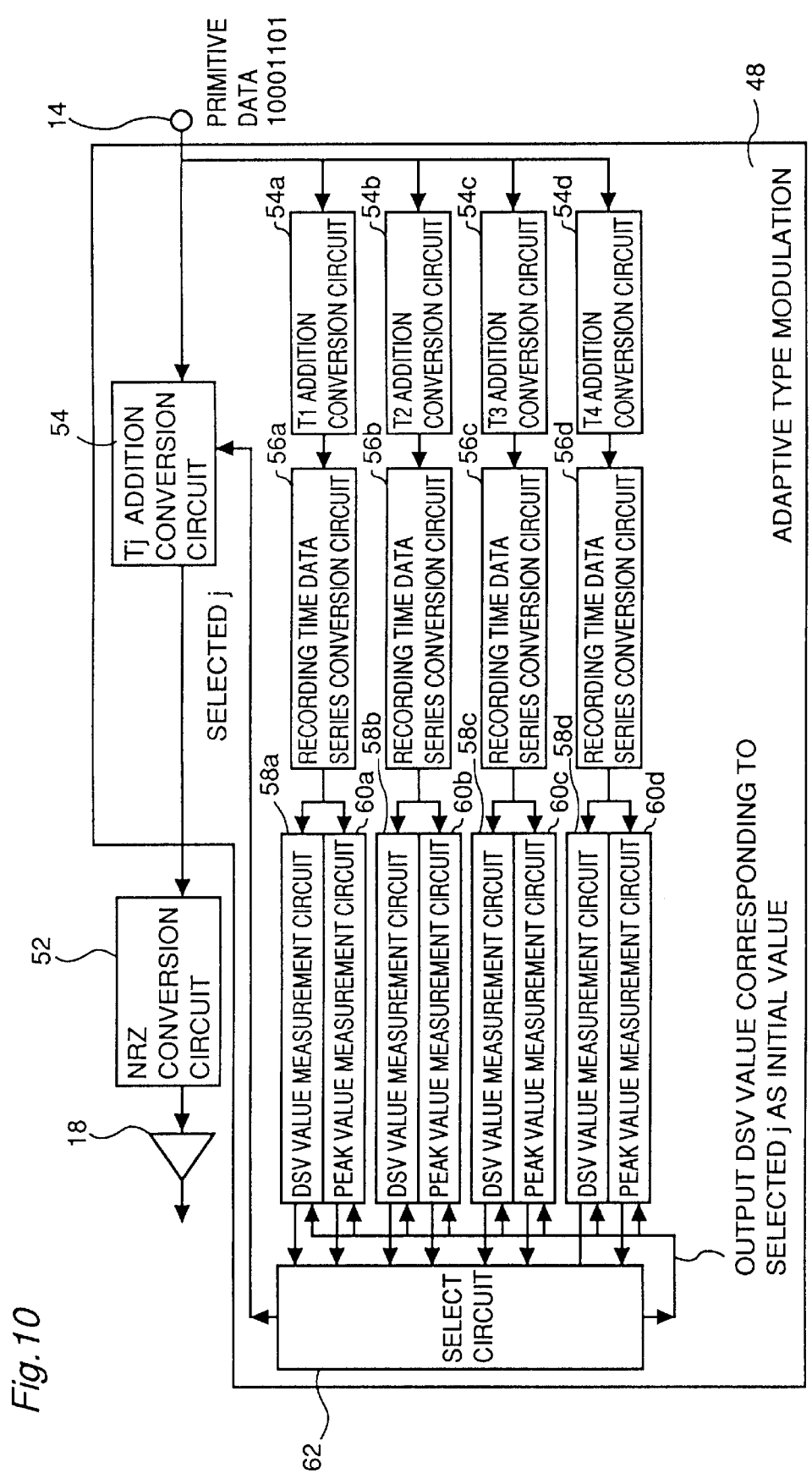
FIG. 10 is a block diagram specifically showing an adaptive type modulation circuit.
Figure 11A:
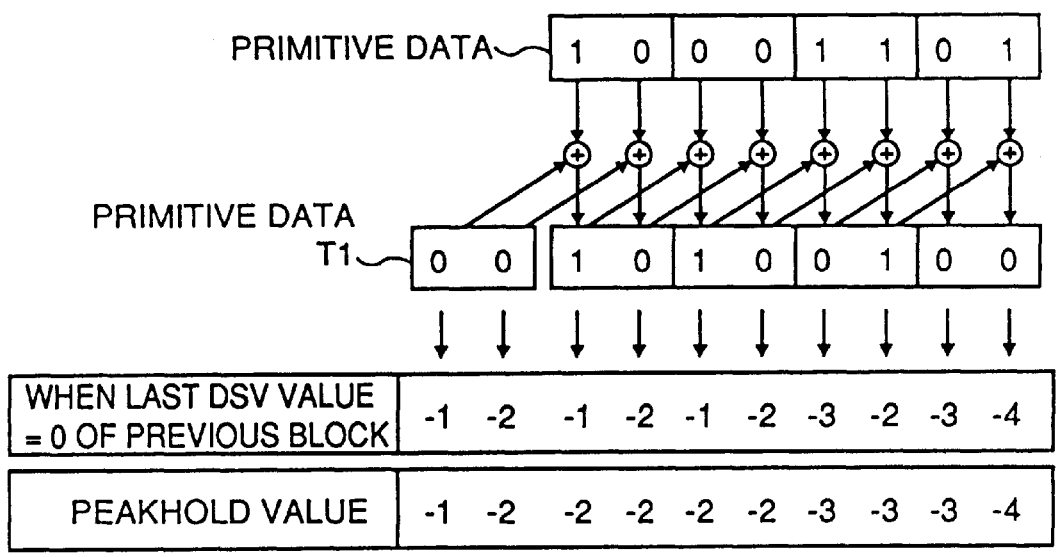
FIGS. 11A and 11B are diagrams for describing an operation of the adaptive type modulation circuit shown in FIG. 10.
Figure 11B:
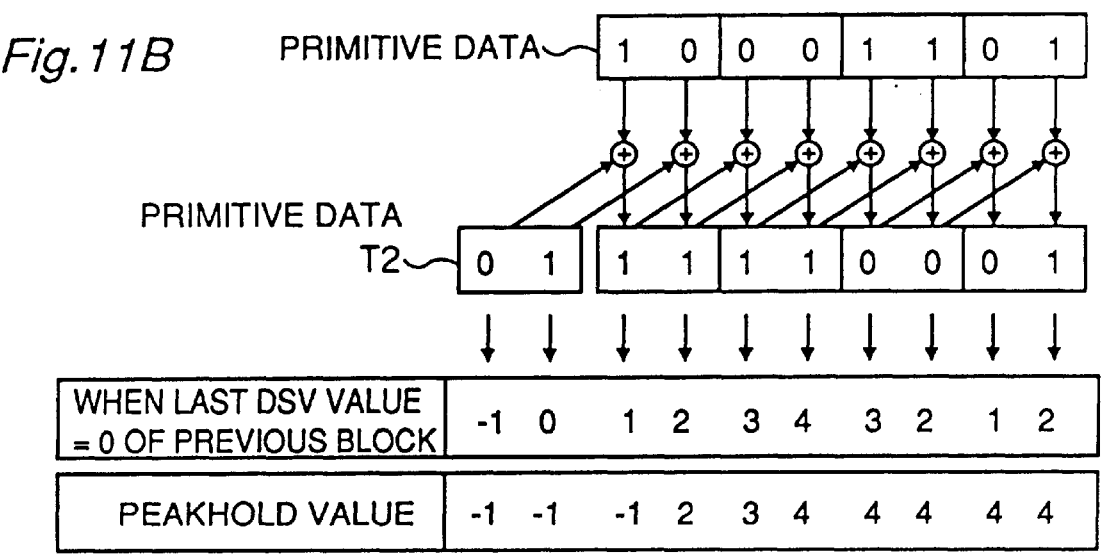

FIG. 9 is a schematic block diagram of an adaptive type modulation circuit; FIG. 10 is a more specific block diagram thereof; and FIGS. 11A and 11B show the processing procedure of an adaptive type modulation circuit.

It is assumed that the initial data has a data length of 2 bits, and the primitive data has a data length of 8 bits. The input 8-bit primitive data is [10001101]. The added 2-bit initial data includes the four types of T1: [00], T2: [01], T3: [10], T4: [11]. Primitive data [1001101] is applied to input terminal 14 of FIG. 10 to be provided to adaptive type modulation circuit 48. The primitive data is applied to Tj addition conversion circuits 54a–54d to be converted. In Tj addition conversion circuit 54a corresponding to T1, the conversion shown in FIG. 11A is carried out. In Tj addition conversion circuit 54b corresponding to T2, the conversion shown in FIG. 11B is carried out.

The outputs of Tj addition conversion circuits 54a–54d are applied to recording time data series conversion circuits 56a–56d. Recording time data series conversion circuits 56a–56d convert the outputs of Tj addition conversion circuits 54a–54d into data series output to the recording/reproduction system. In the present embodiment, the output of Tj addition conversion circuit 54 is applied to NRZ modulation circuit 52 to be modulated and provided to the recording/reproduction system. It can be considered that the output of Tj addition conversion circuit 54 is provided directly to the recording/reproduction system in the present embodiment. The conversion process is ceased at recording time data series conversion circuits 56a–56d, so that the input is output intact.

The outputs of recording time data series conversion circuits 56a–56d are applied to DSV value measurement circuits 58a–58d and to peak value measurement circuits 60a–60d. DST value measurement circuits 58a–58d obtain the DST value of the 10-bit data (primitive data 8 bits+initial data 2 bits) actually output to the recording/reproduction system. Peak value measurement circuits 60a–60d detect and hold the peak value of the direct current variation of the 10 bits (primitive data 8 bits+initial data 2 bits) actually output to the recording/reproduction system. More specifically, in the example shown in FIG. 11A, DSV value measurement circuit 58a outputs "−4", and peak value measurement circuit 60a outputs "−4". In the example shown in FIG. 11B, DSV value measurement circuit 58b outputs "2", and peak value measurement circuit 60b outputs "4". Respective outputs of DSV value measurement circuits 58a–58d and peak value measurement circuits 60a–60d are applied to a select circuit 62.

Select circuit 62 selects the Tj having a small absolute value of this peak value from the outputs of peak value measurement circuits 60a–60d. When the absolute value of the peak value is identical, the Tj having a smaller absolute value of DSV is selected. When the absolute value of this DSV is also identical, either thereof is selected. Select circuit 62 provides this value of j to Tj addition conversion circuit 54. Tj addition conversion circuit 54 carries out the Tj addition conversion according to this j value. Accordingly, adaptive type modulation is carried out to suppress the direct current component at the recording/reproduction system. A Tj having a DSV value of "0" may be selected by select circuit 62. In this case, the DSV value is set as the initial set values of the peak hold of the direct current variation and DSV measurement of the next ten bits (primary data 8 bits+initial data 2 bits).

In determining and providing the Tj by select circuit 62, the outputs of DSV value measurement circuits 58a–58d corresponding to this Tj are provided to peak hold circuits 60a–60d and DSV value measurement circuits 58a–68d to be set as the initial set values of the peak hold of the direct current variation and DSV measurement of the next 10 bits (primitive data 8 bits+initial data 2 bits).

Figure 12A:
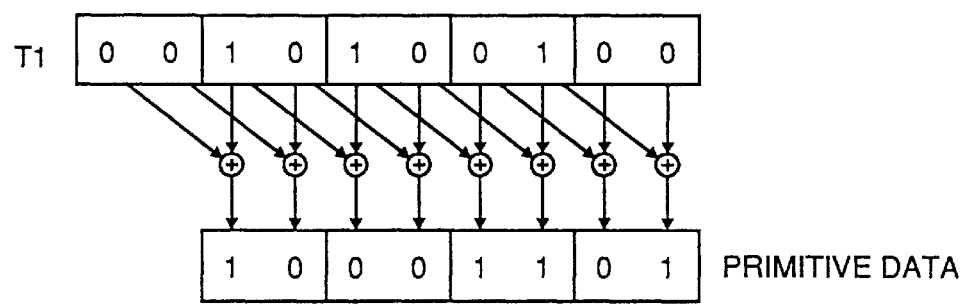
FIGS. 12A and 12B are diagrams for describing a demodulation operation.
Figure 12B:
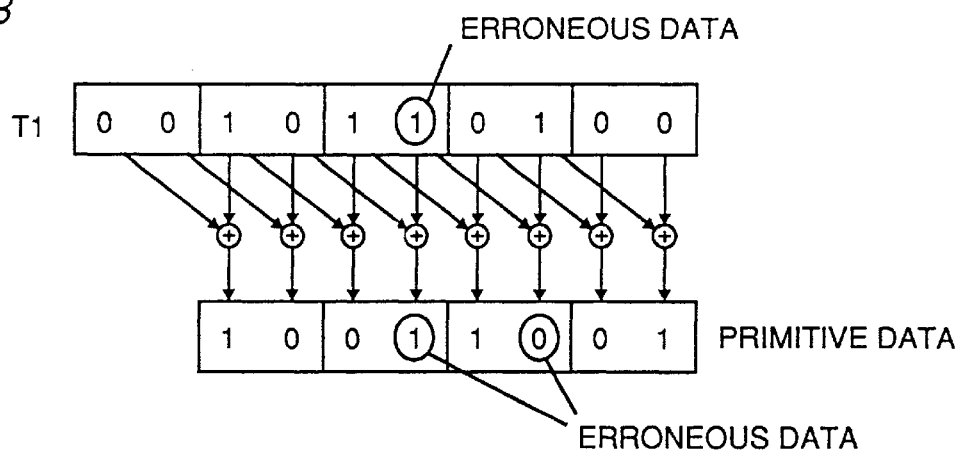

Preventing error propagation in the recording/reproduction system will be described briefly hereinafter. FIGS. 12A and 12B show the procedure in demodulating data that has been modulated by an adaptive type modulation circuit. When the signal shown in FIG. 11A is to be recovered to former data via the recording/reproduction system, the process shown in FIG. 12A is carried out. Even when error occurs in the recording/reproduction system, the error will not be propagated to the entire block as shown in FIG. 12B. The relationship between the data length of primitive data and the data length of the initial data added thereto will be considered hereinafter.

Figure 13:
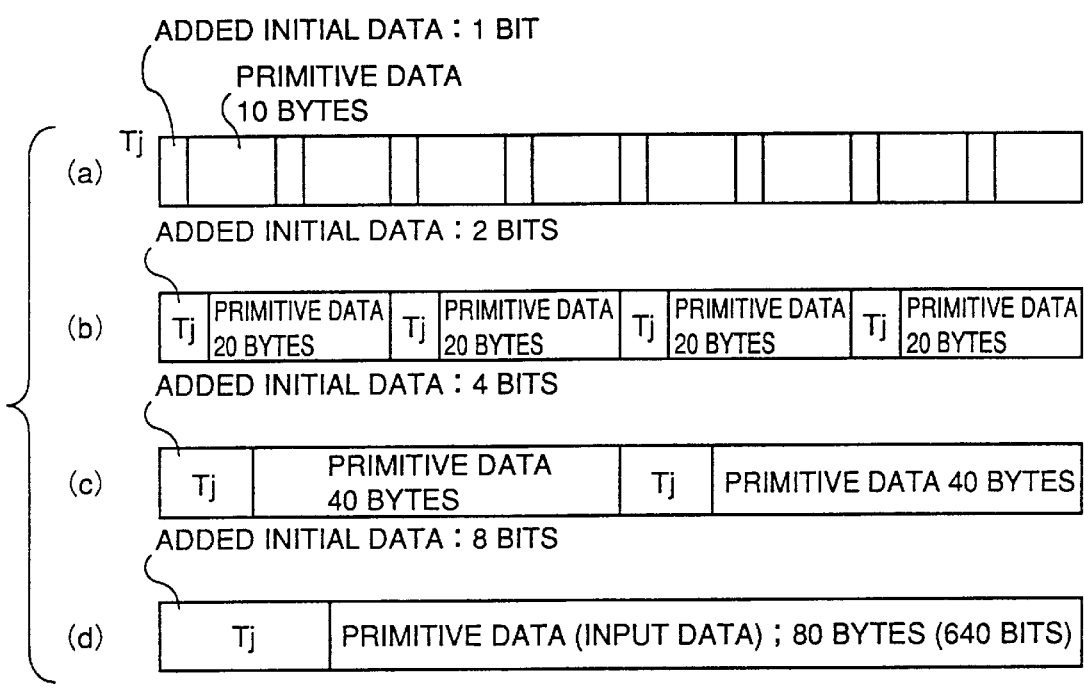
FIG. 13 is a diagram showing the data length relationship between initial data (Tj) and primitive data (input data).
Figure 14:
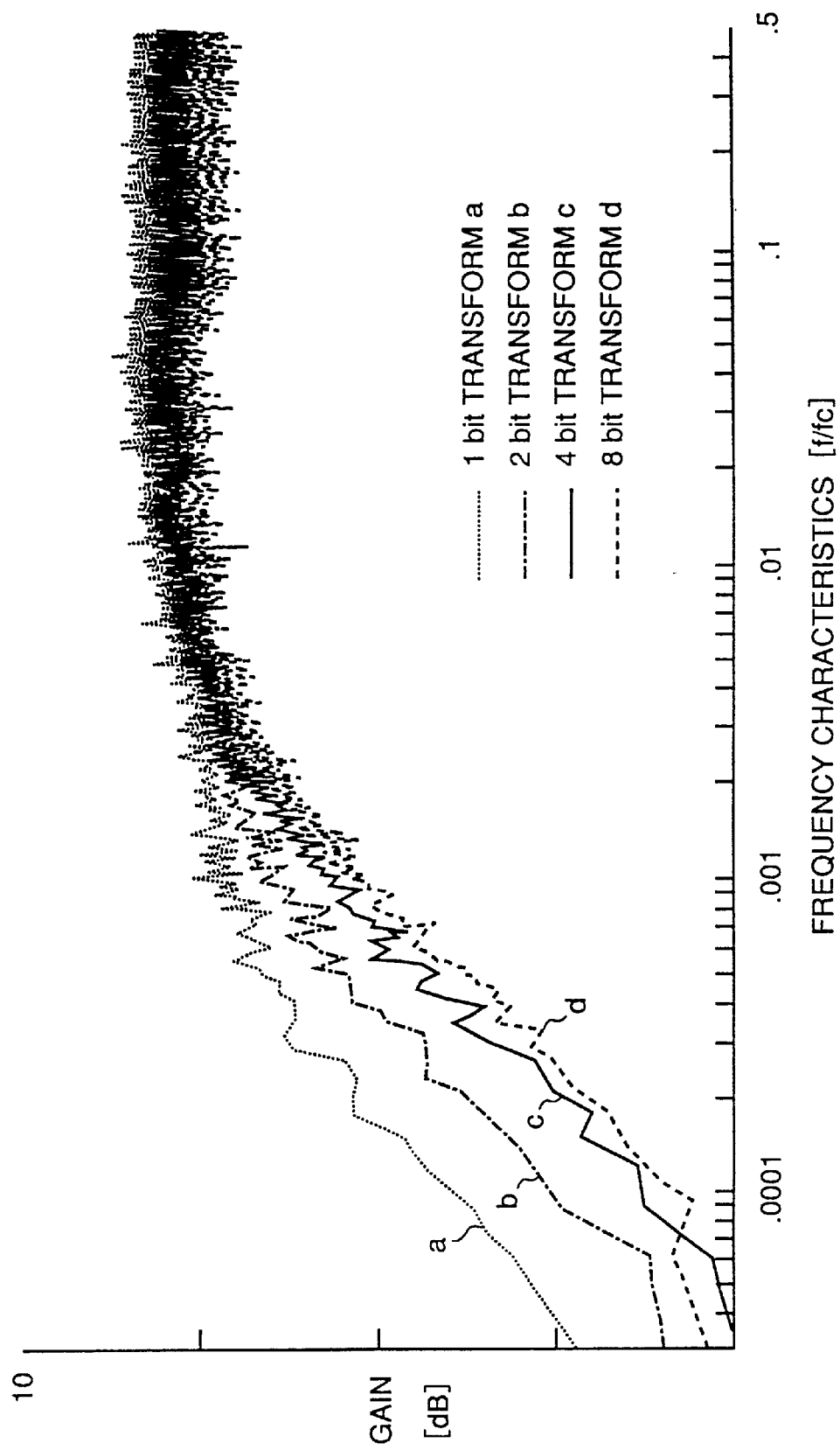
FIG. 14 is a waveform diagram showing a frequency spectrum.
Figure 15:
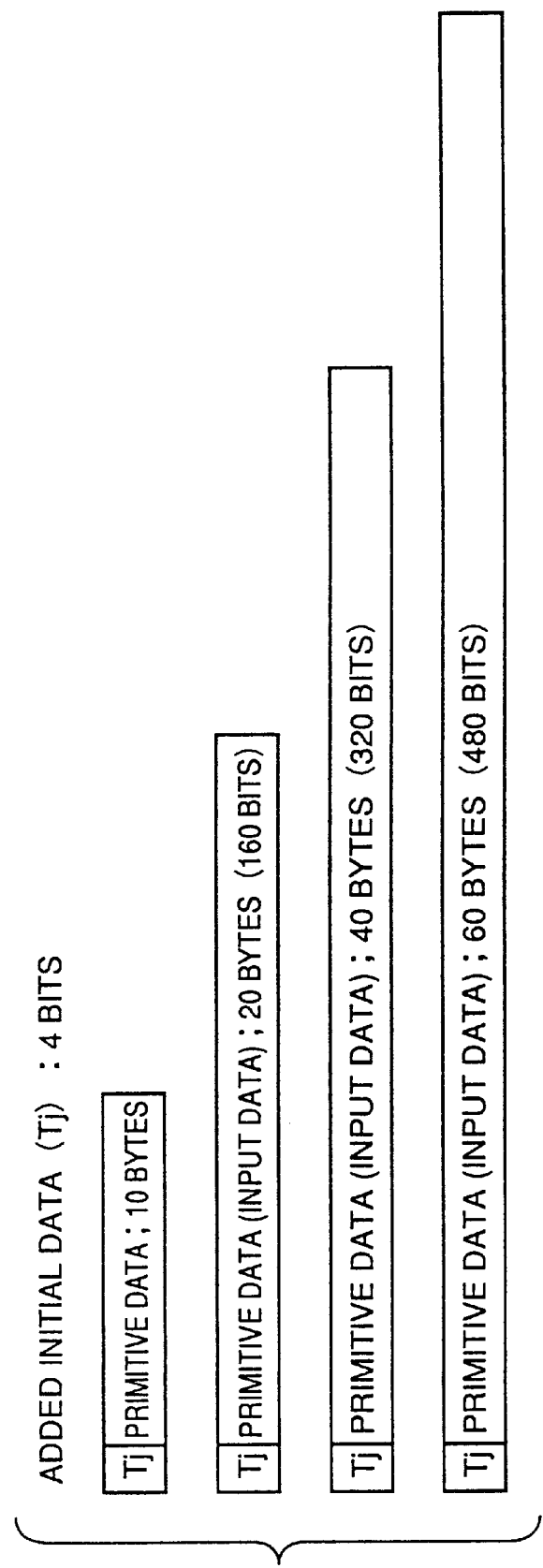
FIG. 15 is a diagram showing the data length relationship between initial data (Tj) and primitive data (input data).

FIG. 13 shows the data length relationship between initial data Tj and primitive data (input data); and FIG. 14 shows a frequency spectrum.

The frequency spectrum as a result of simulation of adaptive type modulation by adding initial data of various data length with a constant data length ratio of the primitive data to initial data of FIG. 13 is shown by the frequency spectrum of FIG. 14. In FIG. 14, the standardized frequency is plotted along the horizontal axis, where f is the frequency component when the data series is frequency-analyzed by Fourier conversion, and fc is the frequency component with the highest frequency. More specifically, fc corresponds to the data series of (101010 . . . ), and the gain is plotted along the vertical axis.

In FIG. 14, the signal component of the low frequency region is suppressed in the data series after the above-described adaptive type modulation as the gain in the region of low standardized frequency becomes smaller. More specifically, the suppression effect of the direct current component which is an object of the present invention is increased. Data of at least 2 bits is preferable as the initial data for observation in FIG. 14. This is because DSV control is not carried out in one block by one bit. In other words, although selection is made from two types in the case of one bit, the two data only differ in opposite polarity. Therefore, adaptive control is not substantially carried out by a DSV value by just one block. In the case of one bit, the initial data of the current block is just set so that the DSV repeated from the prior block is canceled. DSV value control can be carried out only from a plurality of bits. In the case of 2 bits, selection is made from 4 types of data. However, considering the data with only the polarity inverted as one type, there are two types of data. Therefore, adaptive control by a DSV value can be carried out by just one block. In the case of four bits, selection is made from 16 data. Considering data of just opposite polarity as one, there is a total of 8 types. Therefore, adaptive control can be carried out sufficiently by a DSV value for only one block.

Although at least 2 bits is required as the data length n of the initial data, the suppression effect of direct current component is significant when the data length is 4 bits or more, as appreciated from FIG. 14. However, there is no great difference in the suppression effect of the direct current component between the data length of 4 bits and 8 bits for the initial data. It is appreciated from the tendency of the simulation result that improvement in the direct current suppression effect is exhibited up to 32 bits of the data length n of the initial data. A data length greater than 32 bits for initial data will not provide any improvement in the direct current components suppression. Only the block data length will be increased. Therefore, the data length n of the initial data is desirably 8 bits or below taking into consideration the circuit complexity for the above-described adaptive type modulation.

Figure 16:
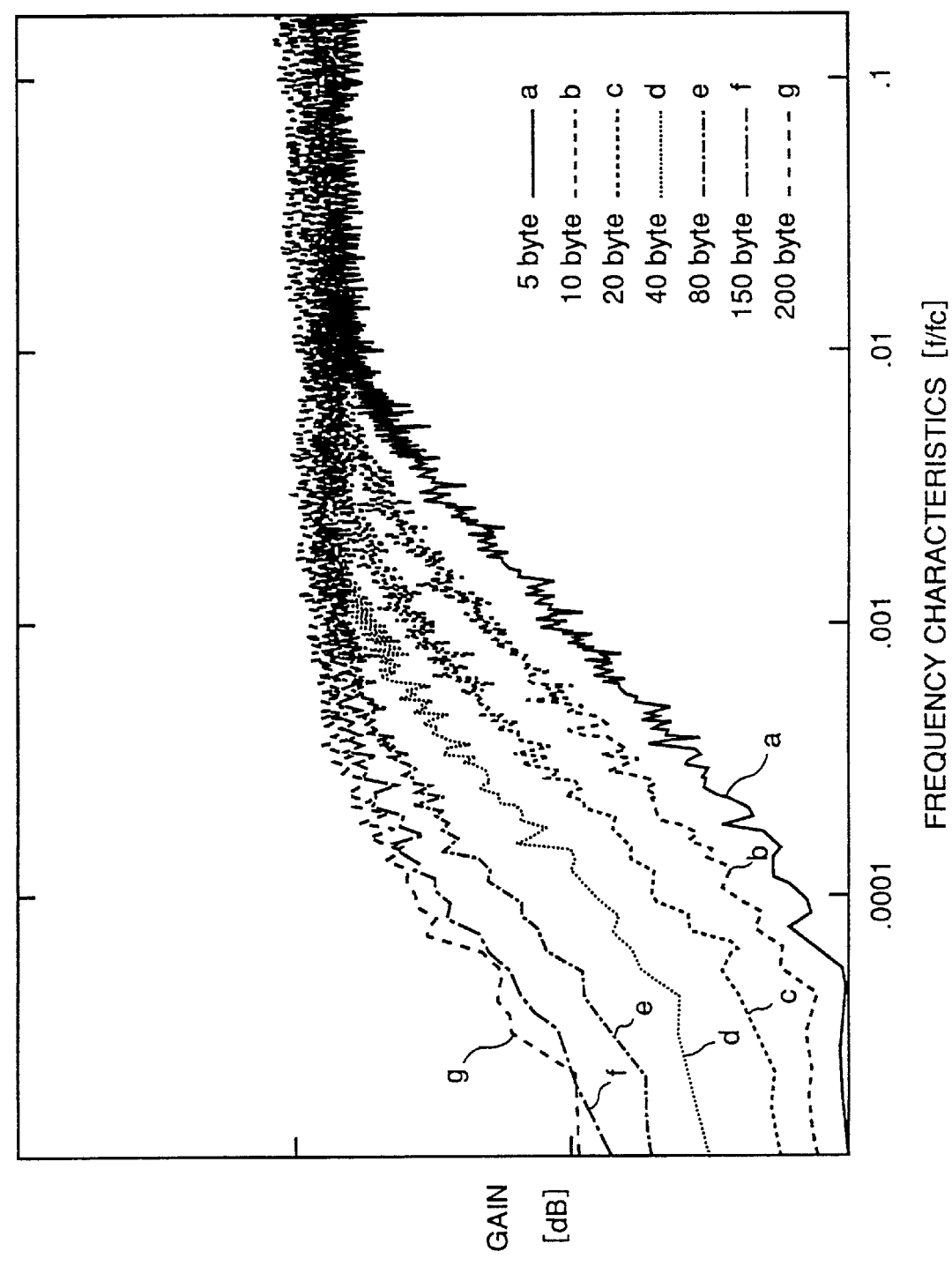
FIG. 16 shows the frequency spectrum of FIG. 15.

Simulation was carried out for adaptive type demodulation with initial data having a data length of 4 bits added to primitive data having various data length m. A frequency spectrum of the result thereof is shown in FIG. 16.

It is appreciated from FIG. 16 that the data length of primitive data is desirably 100 bytes (800 bits) or below when the length of the initial data is 4 bits. Referring to FIG. 16, an excessive short data length of primitive data results in increase in the ratio of the data length of initial data to primitive data. The entire data amount will be increased. Therefore, the data length of primitive data is preferably not more than approximately 10 bytes when the data length of initial data is 4 bits taking into consideration redundancy of the initial data.

In view of the foregoing, the data length n of initial data and the data length m of primitive data are preferably set so as to satisfy the following equation.

$$(4 \text{ bits}/800 \text{ bits}) \leq (n/m) \leq (4 \text{ bits}/80 \text{ bits})$$

More specifically, $$0.005 \leq (n/m) \leq 0.05$$

Considering that the data length n of the initial data is preferably $4 \leq n \leq 8$ (bits) from the result of the simulation of FIG. 14, the data length m of primitive data should preferably satisfy the following equation.

$$80 \leq m \leq 1600 \text{ (bits)}$$

Also, data length m of primitive data set to an integer multiple of the data length n of initial data is preferable from the standpoint of efficiency since the operation of modulo2 can be completed. This adaptive type modulation may be employed together with another RLL modulation as mentioned before.

FIGS. 17A–17E show combinations of the modulation circuits. FIG. 17A corresponds to the example shown in FIG. 9; FIG. 17B corresponds to an arrangement of a RLL modulation circuit 60 provided as a preceding stage of adaptive type modulation circuit 48 of FIG. 17; and FIG. 17C corresponds to an arrangement of an NRZI modulation circuit 70 instead of NRZ modulation circuit 52 of FIG. 17A. FIG. 17D corresponds to an arrangement of RLL modulation circuit 60 as a preceding stage of adaptive type modulation circuit 48 of FIG. 17C; and FIG. 17E corresponds to an arrangement of exchange of adaptive type modulation circuit 48 and RLL modulation circuit 60 of FIG. 17D.

When the present invention is applied to a conventional disk, the arrangement shown in FIG. 17E is preferable. According to the arrangement of FIG. 17E, the DSV value must be measured taking into consideration RLL modulation circuit 60 and NRZI modulation circuit 70 in selecting Tj by adaptive type modulation circuit 48. However, since the self clock component generated at RLL modulation circuit 60 is provided to the recording/reproduction system without being destroyed, both self clock recording and current component suppression can be achieved reliably.

In the previous embodiment, the convolution process is carried out from the beginning in the units of the data length n of the initial data. However, an arbitrary order may be taken.

Figure 18A:
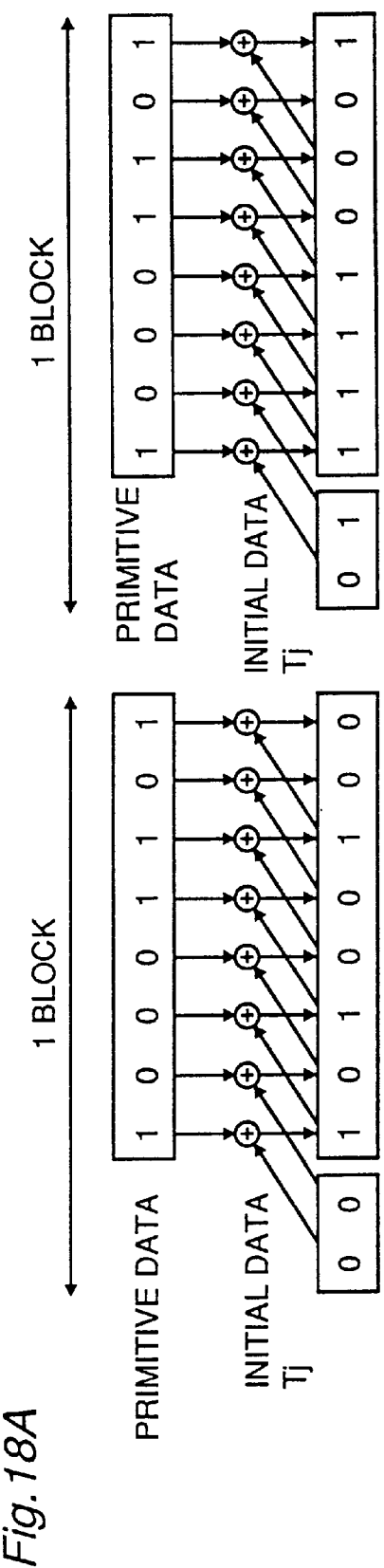
FIGS. 18A and 18B show examples of Tj arranged together.
Figure 18B:
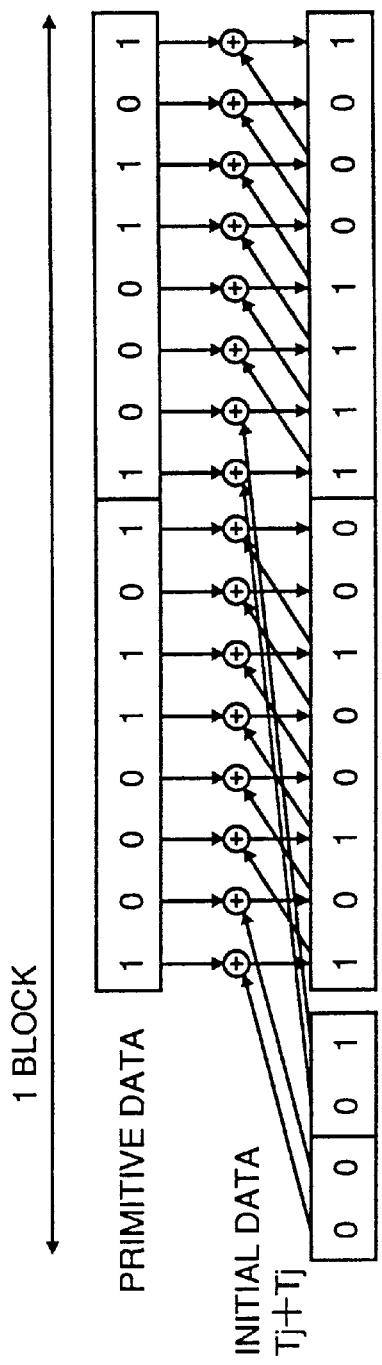

FIGS. 18A and 18B show an arrangement of Tj together.

Figure 19:
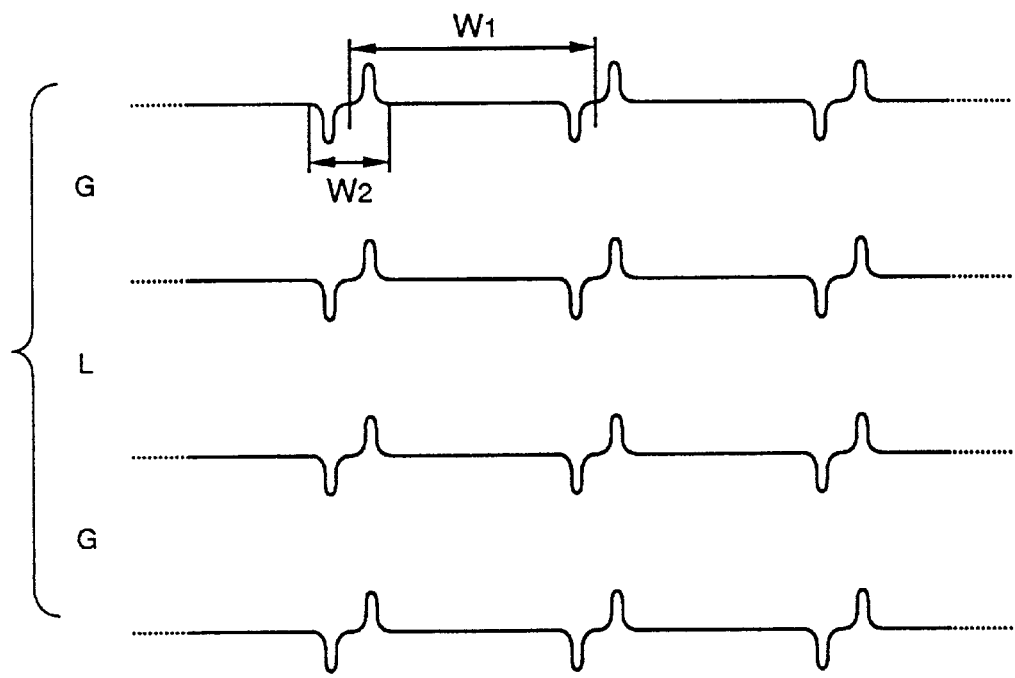
FIG. 19 shows an example of a clock mark provided in a linear track.
Figure 20:
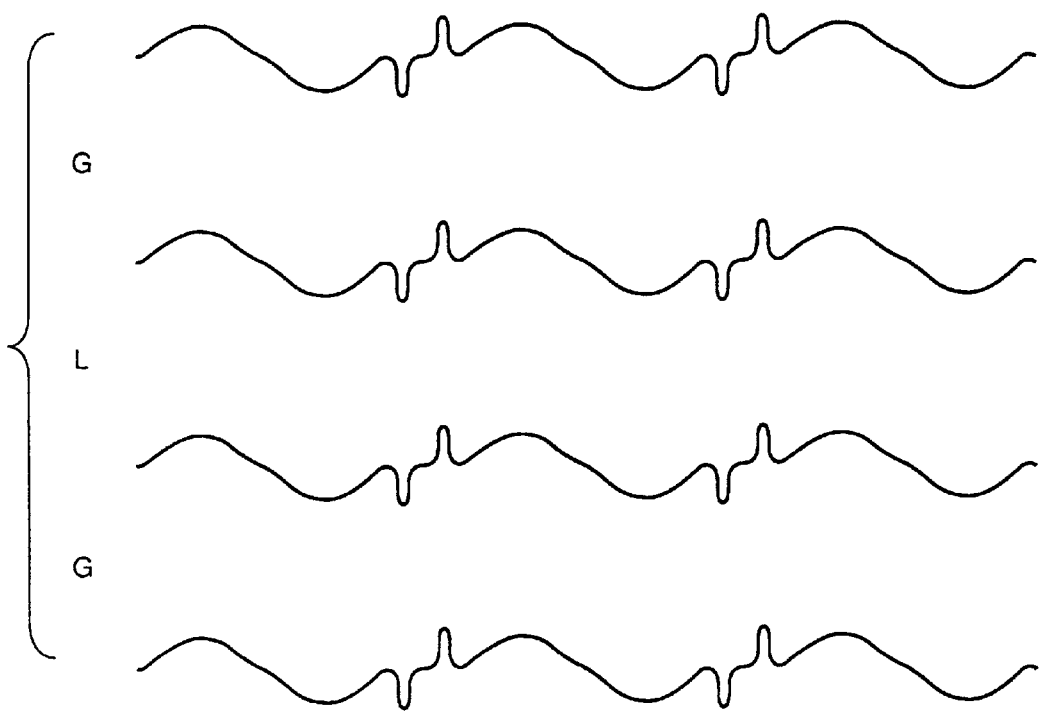
FIG. 20 shows an example of a clock mark provided in a meandering track.
Figure 21:
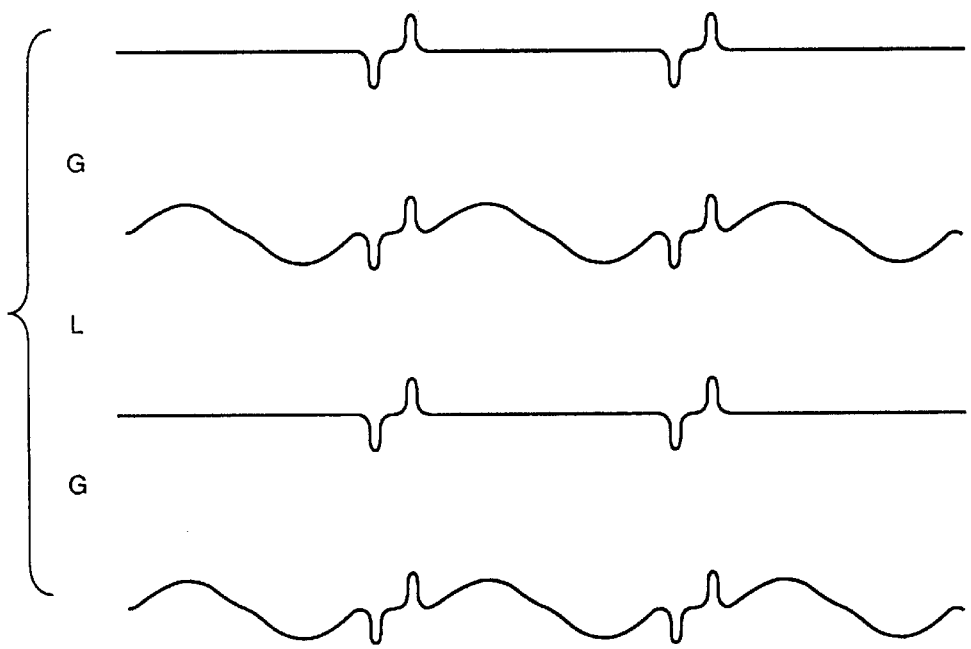
FIG. 21 shows an example of a track having one side linear and the other side wobbled.

FIGS. 19–21 show examples having a clock mark of low frequency provided instead of the continuous wobble shown in FIGS. 1–3. Particularly, FIG. 19 shows an example of a linear track, wherein a clock mark of a cycle of w1 and a width of w2 is inserted. FIG. 20 corresponds to a meandering track; and FIG. 21 corresponds to a track having one linear side and another meandering side.

Figure 22:
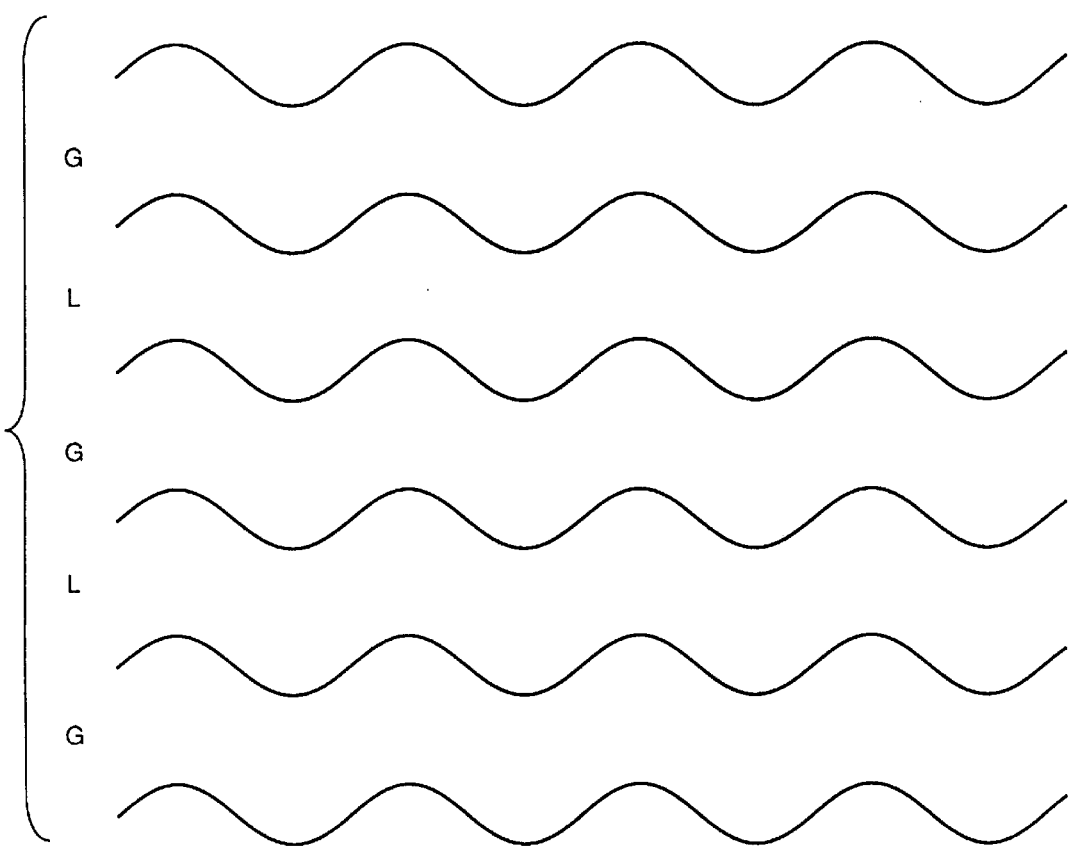
FIG. 22 shows an example where the meander configuration of a track is in phase at both walls of the groove and land.
Figure 23:
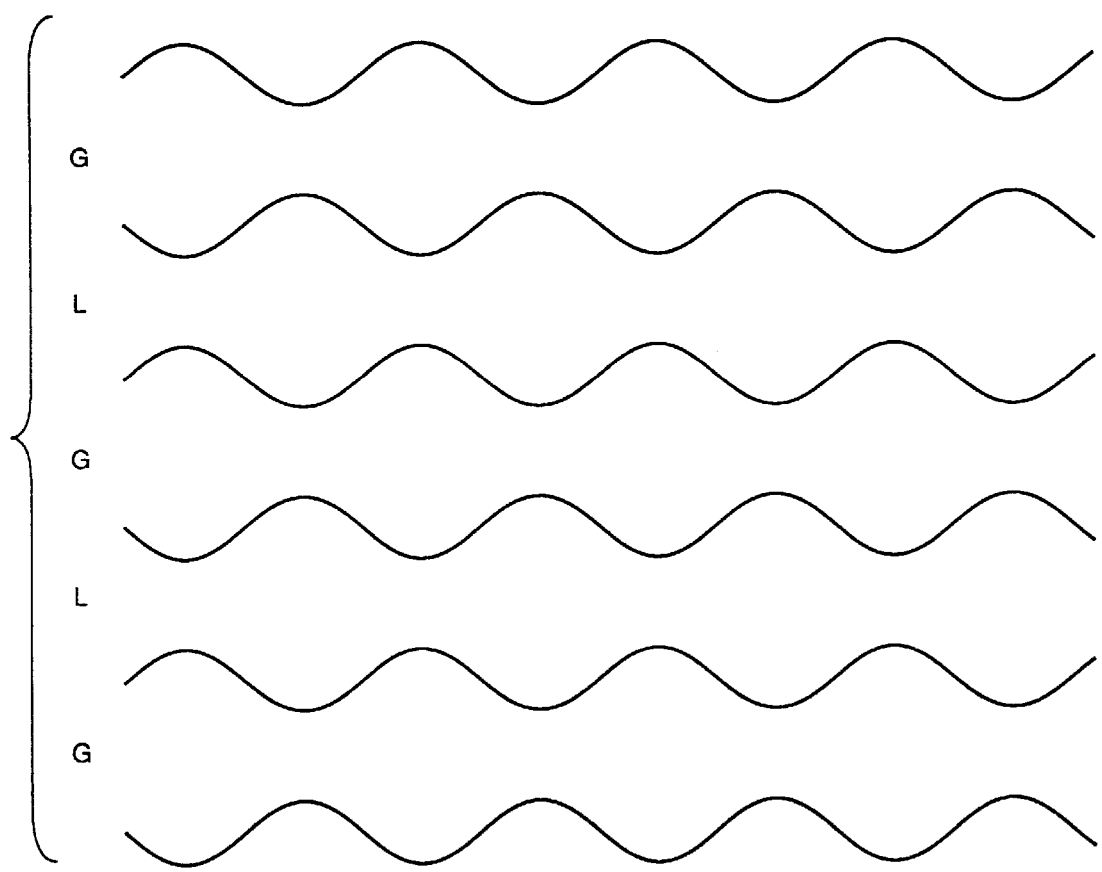
FIG. 23 shows an example in which the meander configuration of a track is in opposite phase at both walls of the groove and land.
Figure 24:
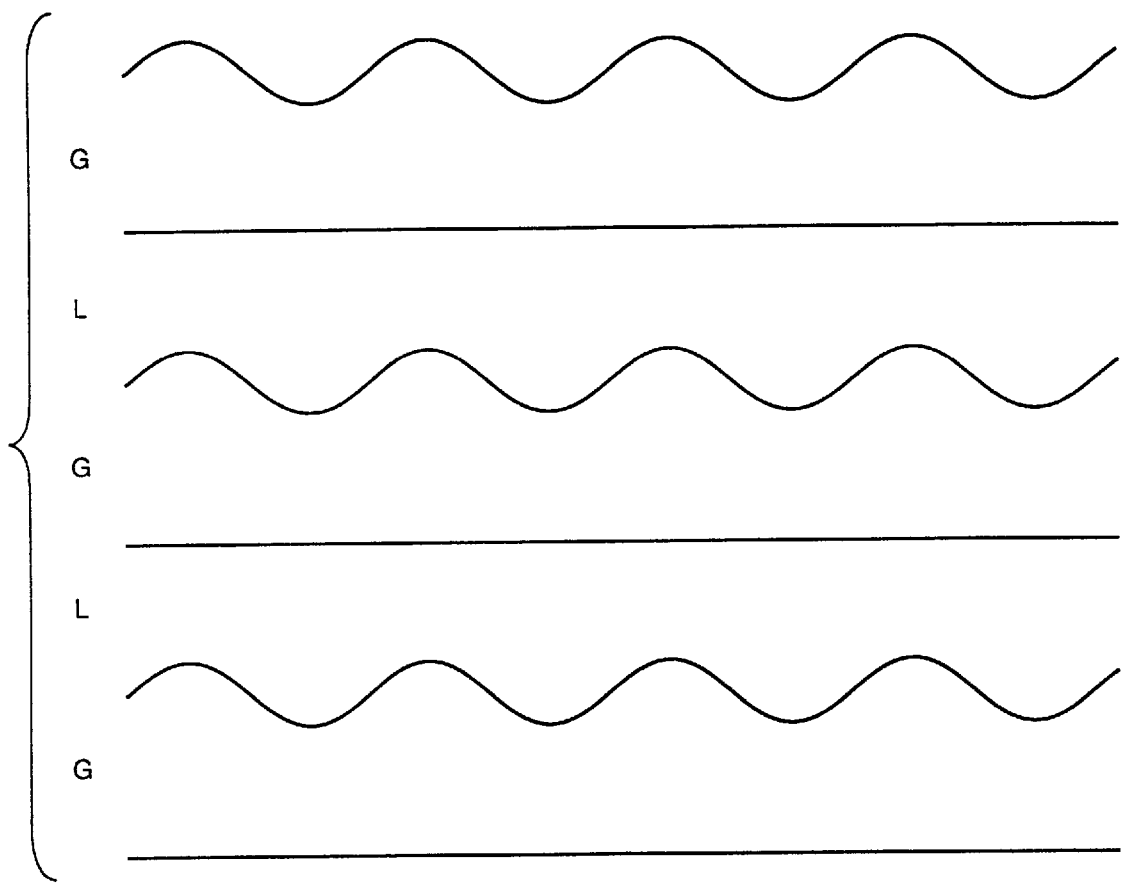
FIG. 24 shows an example in which only one of the walls of the groove and land meanders in a track.

FIG. 22 corresponds to a track having a meander configuration of the same phase at both walls of the groove and land; FIG. 23 corresponds to a meandering track of opposite phase at both walls of the groove and land; and FIG. 24 corresponds to a track of a configuration where only one wall of the groove and land meanders. Each embodiment of the present invention can be applied in any of such cases.

According to the present invention, the direct current component at the recording/reproduction system can be suppressed with only a small increase in the data length. Since the reference clock signal is obtained from a wobble signal, data modulation for self clocking does not have to be considered. Furthermore, data can be recorded/reproduced to or from a digital disk at high efficiency. A digital recording apparatus with little error propagation and fine suppression of direct current components can be provided.

What is claimed is:

1. A digital recording method for selecting and recording modulation record data that has a direct current component of recording suppressed out from a group of modulation record data candidates, comprising the steps of:

adding a plurality of types of data of a predetermined number of bits as initial data to input data;

applying a convolution process by performing an exclusive-OR operation between a current code modulation unit to be transformed and a code modulation unit immediately before said current code modulation unit in a predetermined sequence for every of said predetermined number of bits and substituting the obtained value for said current code modulation unit to generate said group of a plurality of types of modulation record data candidates from said input data; and comparing current components of recording of each of said plurality of types of modulation record data for selecting and recording modulation record data according to a comparison result.

2. The digital recording method according to claim 1, wherein said initial data added to said input data has a data length n of $2 \leq n \leq 32$.

3. The digital recording method according to claim 2, wherein said data length n of said initial data is $4 \leq n \leq 8$.

4. The digital recording method according to claim 1, wherein m and n satisfy a relationship of $0.005 \leq n/m \leq 0.05$ where said input data has a data length of m bits (m is an integer), and said initial data added to the input data has a data length of n bits (n is an integer).

5. The digital recording method according to claim 1, wherein said input data has a data length of $80 \leq m \leq 1600$.

6. The digital recording method according to claim 1, wherein said input data has a data length m which is L times (L is an integer of at least 2) said initial data.

7. A digital disk in which modulation record data suppressed in a direct current component of recording selected and recorded out from a group of modulation record data candidates, wherein a plurality of types of data of a predetermined number of bits are applied to input data as initial data; a convolution process is applied for every said predetermined number of bits in a predetermined sequence by performing an exclusive-OR operation between a current code modulation unit to be transformed and a code modulation unit right before said current code modulation unit and substituting the obtained value for said current code modulation unit to generate said group of a plurality of types of modulation record data candidates from the input data; and comparing direct current components of recording of each of said plurality of types of modulation record data with each other to select and record modulation record data according to a comparison result.

8. The digital disk according to claim 7, wherein said initial data added to said input data has a data length n of $2 \leq n \leq 32$.

9. The digital disk according to claim 8, wherein said data length n of said initial data is $4 \leq n \leq 8$.

10. The digital disk according to claim 7, wherein m and n satisfy a relationship of $0.005 \leq (n/m) \leq 0.05$ where said input data has a data length of m bits (m is an integer), and said initial data added to said input data has a data length of n bits (n is an integer).

11. The digital disk according to claim 7, wherein said input data has a data length n of $80 \leq n \leq 1600$.

12. The digital disk according to claim 7, wherein said input data has a data length m of L times (L is an integer of at least 2) said initial data.

* * * * *